United States Patent
Skrizhinsky et al.

(10) Patent No.: US 11,014,632 B2
(45) Date of Patent: May 25, 2021

(54) APPARATUSES, SYSTEMS, AND METHODS FOR AQUATIC TRANSPORTATION, STORAGE, AND DISTRIBUTION

(71) Applicants: Alexander Skrizhinsky, Gaithersburg, MD (US); Denis Dobrovolskii, Rockville, MD (US)

(72) Inventors: Alexander Skrizhinsky, Gaithersburg, MD (US); Denis Dobrovolskii, Rockville, MD (US)

( * ) Notice: Subject to any disclaimer, the term of this patent is extended or adjusted under 35 U.S.C. 154(b) by 260 days.

(21) Appl. No.: 16/373,029

(22) Filed: Apr. 2, 2019

(65) Prior Publication Data

US 2019/0308695 A1 Oct. 10, 2019

Related U.S. Application Data

(60) Provisional application No. 62/652,359, filed on Apr. 4, 2018.

(51) Int. Cl.
| | | |
|---|---|---|
| *G06F 7/00* | (2006.01) | |
| *B63B 22/28* | (2006.01) | |
| *B65G 1/137* | (2006.01) | |
| *B65D 88/78* | (2006.01) | |

(52) U.S. Cl.
CPC ............ *B63B 22/28* (2013.01); *B65D 88/78* (2013.01); *B65G 1/1373* (2013.01); *B63B 2207/02* (2013.01)

(58) Field of Classification Search
USPC .................. 700/213–216, 218, 228–229
See application file for complete search history.

(56) References Cited

U.S. PATENT DOCUMENTS

| | | | |
|---|---|---|---|
| 6,327,994 B1 * | 12/2001 | Labrador | ............... F03D 5/00 114/382 |
| 6,616,385 B1 | 9/2003 | Raginskii | |
| 8,878,682 B2 | 11/2014 | Kenney | |
| 9,624,034 B1 | 4/2017 | Brazeau | |
| 9,656,801 B2 * | 5/2017 | Chitwood | ............ B65D 90/046 |
| 9,758,302 B1 | 9/2017 | Brazeau | |
| 10,046,907 B2 | 8/2018 | Chitwood | |
| 2016/0101832 A1 * | 4/2016 | Teppig, Jr. | ............... B63H 5/07 114/256 |
| 2017/0321651 A1 | 11/2017 | Westmoreland | |

* cited by examiner

*Primary Examiner* — Yolanda R Cumbess
(74) *Attorney, Agent, or Firm* — Carsey School of Law, MIPLRC/IPEC

(57) ABSTRACT

An aquatic transportation, storage, and distribution system, including one or more storage containers and a guide structure. The storage container is capable of retaining one or more items therein and is configured to selectively vary the buoyancy thereof to urge the storage container to float up or sink down within an aquatic environment. The guide structure is supported at least partially within the aquatic environment and includes at least one non-horizontal segment. The storage container is configured to interact with the at least one segment as the storage container is urged to float up or sink within the aquatic environment such that the storage container is moved along the guide structure and is routed to a specified extraction point for retrieval from the aquatic environment.

20 Claims, 7 Drawing Sheets

… (US 11,014,632 B2)

APPARATUSES, SYSTEMS, AND METHODS FOR AQUATIC TRANSPORTATION, STORAGE, AND DISTRIBUTION

TECHNICAL FIELD

The present disclosure relates to aquatic storage and, more particularly, to apparatuses, systems, and methods facilitating the aquatic transportation, storage, and distribution of items such as consumer goods, component parts, raw materials, etc.

BACKGROUND

Warehouses traditionally function as storage and distribution facilities that operate to receive items from manufacturers, vendors, other warehouses, etc., store the items in designated storage spaces, and, as needed, output the items for delivery to manufactures, consumers, retail stores, other warehouses, etc. Such warehouses are typically expansive buildings with a vast system of storage apparatuses such as, for example, racks, shelves, bins, etc., that are spread out over large distances and/or multiple levels. In order to store or retrieve a particular item, the storage location must be identified and, thereafter, the items transported to or retrieved from that storage location. The items may be stored and/or retrieved manually by workers, e.g., on-foot, semi-automatically by workers, e.g., using a forklift, or automatically, e.g., using a robotic system. One or more input docks enable the receipt of items for storage in the warehouse, and one or more output docks, different from or the same as the input docks, enable the distribution of items from the warehouse.

The growth of online marketplaces as well as the seemingly infinite number of different items capable of being purchased through online marketplaces has led to increasingly larger and more complex warehouses to accommodate the increased volume and variety of items required to be stored and distributed. Such warehouses require large amounts of usable real estate and significant capital expenditure in terms of the building itself, storage apparatuses, and tracking and transport systems within the warehouse. The need to continually track and transport items within, to, and from the warehouse, as well as the increased utilities demand for lighting, powering equipment, temperature regulation, etc., also results in relatively high operating costs for such warehouses.

There is thus a need for transportation, storage, and distribution solutions that do not require vast amounts of usable real estate and have reduced capital expenditure and operating costs.

BRIEF DESCRIPTION OF THE DRAWINGS

Aspects and features of the present disclosure are described herein below with reference to the drawings, wherein.

DETAILED DESCRIPTION OF THE EMBODIMENTS

Figure 1:
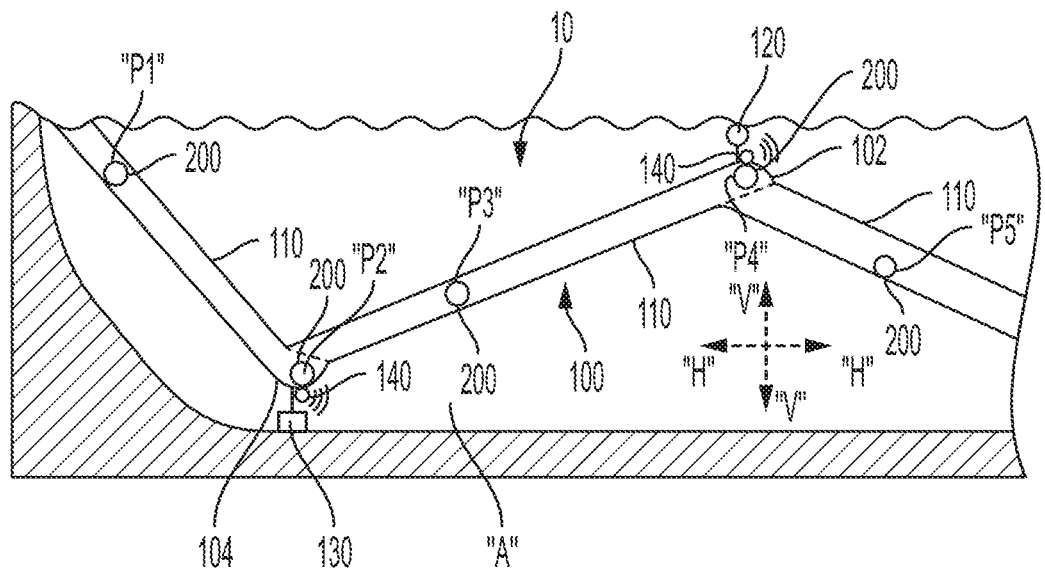
FIG. 1 is a cross-sectional view of a portion of an aquatic transportation, storage, and distribution system provided in accordance with aspects of the present disclosure, according to an embodiment.

The present disclosure provides apparatuses, systems, and methods facilitating the aquatic transportation, storage, and distribution of items such as consumer goods, component parts, raw materials, etc. More specifically, the present disclosure provides systems including storage containers for use in an aqueous environment that have variable-buoyancy to enable vertical (e.g., up or down) movement of the storage containers within the aqueous environment, and guide structures at least partially disposed within the aqueous environment that, in conjunction with varying the buoyancy of the storage containers, enable horizontal (e.g., side-to-side) movement of the storage containers within the aqueous environment without the requirement for internal or external propulsions mechanisms. Thus, by configuring the guide structures and correspondingly controlling the buoyancy of the storage containers, these systems enable the storage containers to achieve a desired combination of vertical and horizontal motion to enable movement of the storage containers to any position within the aqueous environment with minimal to no external power required.

To the extent consistent, any of the aspects and features detailed herein may be utilized with any of the other aspects and features detailed herein, despite the same being described separately herein.

Provided in accordance with aspects of the present disclosure is an aquatic transportation, storage, and distribution system including a storage container and a guide structure. The storage container is capable of retaining one or more items therein and is configured to selectively vary the buoyancy thereof to urge the storage container to float up or sink down within an aquatic environment. The guide structure is supported at least partially within the aquatic environment and includes at least one angled segment, comprising of a non-horizontal-segment. The storage container is configured to interact with the at least one angled segment as the storage container is urged to float up or sink down within the aquatic environment such that the storage container is moved along the at least one angled segment in a direction having both vertical and horizontal components.

In an aspect of the present disclosure, a location communication system configured to enable determination of a location of the storage container relative to the guide structure is provided.

In another aspect of the present disclosure, a control system configured to direct the storage container to vary the buoyancy of the storage container based on the location of the storage container relative to the guide structure is provided.

A method of aquatic transportation, storage, and distribution provided in accordance with the present disclosure includes varying a buoyancy of a storage container to urge the storage container to float up or sink down within an aquatic environment into contact with a guide structure such that the storage container is moved along at least one angled segment of the guide structure in a direction having both vertical and horizontal components.

In an aspect of the present disclosure, the method further includes determining a location of the storage container relative to the guide structure and varying the buoyancy of the storage container based on the location of the storage container relative to the guide structure.

Various additional aspects and features of the systems and apparatuses (storage containers and guide structures) and methods of operating the same of the present disclosure are detailed below. However, while detailed embodiments are described below, the disclosed embodiments are merely examples of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Figure 2:
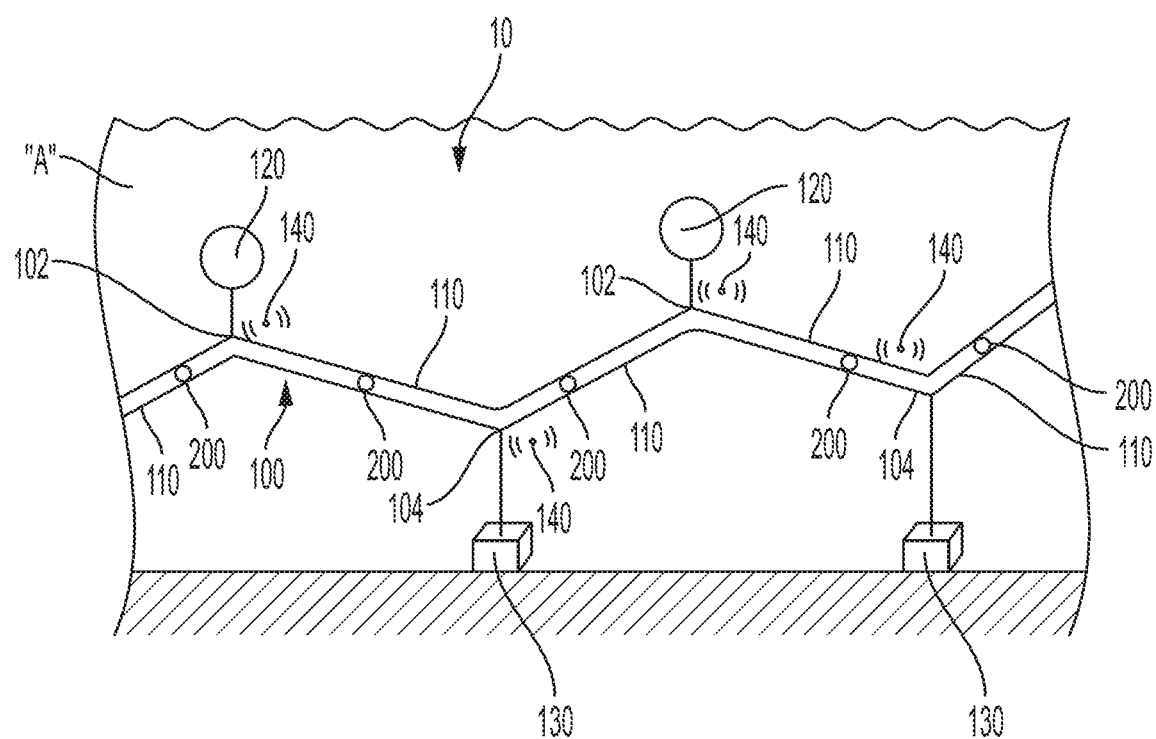
FIG. 2 is a cross-sectional view of another portion of the aquatic transportation, storage, and distribution system of FIG. 1, according to an embodiment.

With reference to FIGS. 1 and 2, an aquatic transportation, storage, and distribution system is shown generally identified by reference numeral 10 in use in an aqueous environment "A" such as, for example, a naturally occurring or man-made body of water. Aquatic transportation, storage, and distribution system 10 includes a guide structure 100 and a plurality of storage containers 200. Guide structure 100 includes a plurality of angled segments, comprising of non-horizontal segments, 110 interconnected with one another, each disposed obliquely relative to a vertical axis "V" and a horizontal axis "H" of the aqueous environment "A." Guide structure 100 may be maintained in position within the aqueous environment "A" via balloons (or buoys) 120 and weights 130, as illustrated, although any other suitable structures for retaining guide structure 100 in position within the aqueous environment "A" may also be provided.

Storage containers 200 are configured to receive items therein and protect the items from the aqueous environment "A," are configured to facilitate movement through angled segments 110 of guide structure 100 (such as, for example, by defining spherical outer surfaces or other suitable configurations), and are selectively controllable to vary their buoyancy to enable storage containers 200 to maintain a vertical position within the aqueous environment "A," urge storage containers 200 to float up towards the surface of the aqueous environment "A," and to urge storage containers 200 to sink down towards the floor of the aqueous environment "A." Storage containers 200 also include passive or active communication components configured to enable proximity and/or location detection of each storage container 200 and to receive control signals to vary the buoyancy of storage containers 200 in a particular manner. Various embodiments of storage containers 200 are detailed below with reference to FIGS. 10 and 11.

Continuing with reference to FIGS. 1 and 2, in order to move a storage container 200 along guide structure 100 from one horizontal location to the other, the buoyancy of the storage container 200 is varied according to the orientation of the angled segment 110 within which it is disposed. For example, when a storage container 200 is disposed within a downwardly-sloped segment (wherein the direction of slope is determined in the desired direction of travel), the buoyancy of that storage container 200 is decreased such that the storage container 200 is urged to sink down towards the floor of the aqueous environment "A." However, rather than sinking in only a vertically-downward direction, the angled segment 110 guides the storage container 200 to also move in a horizontal direction, owing to the fact that the angled segment 110 is downwardly sloped and constrains the storage container 200 therein. Thus, a storage container 200 disposed within guide structure 100 can be moved, for example, from a first position "P1" to a second position "P2," from a fourth position "P4" to a fifth position "P5," etc., simply by decreasing the buoyancy of the storage container 200.

On the other hand, when a storage container 200 is disposed within an upwardly-sloped segment (wherein the direction of slope is determined in the desired direction of travel), the buoyancy of that storage container 200 is increased such that the storage container 200 is urged to float up towards the surface of the aqueous environment "A." However, rather than floating up in only a vertical direction, the angled segment 110 guides the storage container 200 to also move in a horizontal direction, due to the fact that the angled segment 110 is upwardly sloped and constrains the storage container 200 therein. Thus, a storage container 200 disposed within guide structure 100 can be moved, for example, from the second position "P2" to a third position "P3" simply by increasing the buoyancy of the storage container 200.

As can be appreciated, guide structure 100 may be configured in any suitable manner with any suitable number and configuration of angled segments 110 to move a storage container 200 to any suitable vertical or horizontal location, without internal or external propulsion and with minimal to no energy expenditure.

Figure 3:
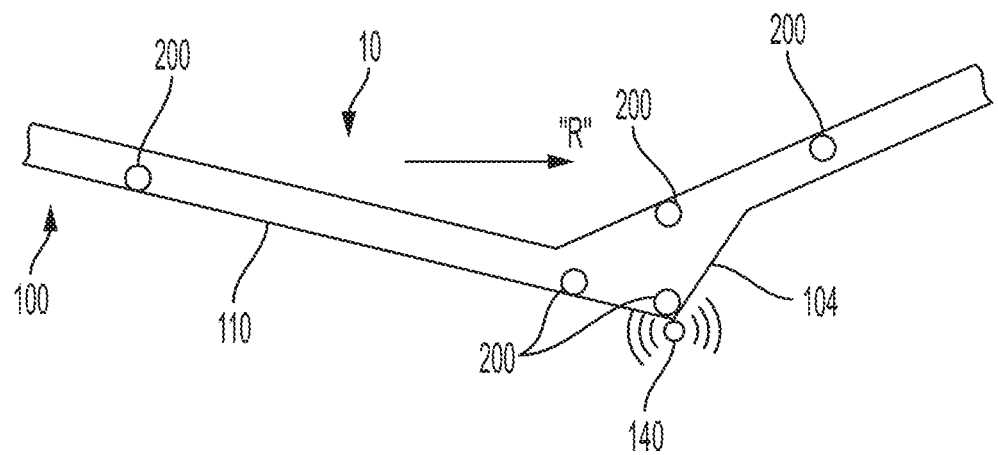
FIG. 3 is a cross-sectional view of a right-handed elbow of the aquatic transportation, storage, and distribution system of FIG. 1, according to an embodiment.
Figure 4:
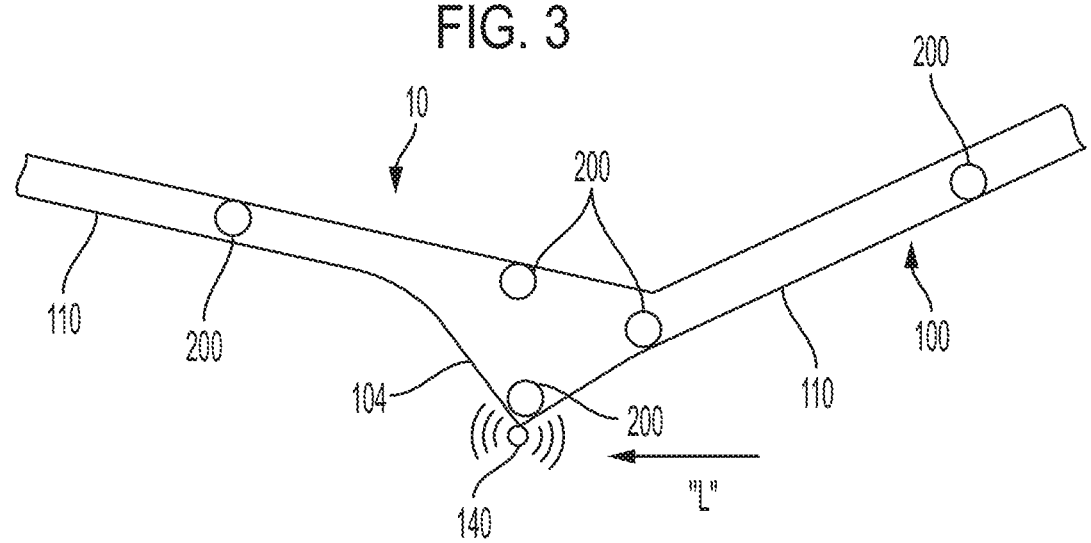
FIG. 4 is a cross-sectional view of a left-handed elbow of the aquatic transportation, storage, and distribution system of FIG. 1, according to an embodiment.

Referring also to FIGS. 3 and 4, when a storage container 200 reaches a joint between angled segments 110, e.g., a peak 102 or a valley 104, the buoyancy of storage container 200 is required to be reversed to enable storage container 200 to continue to move along the guide structure 100. In order to signal to storage container 200 when such a joint has been reached, communication beacons 140 may be disposed at the joints of guide structure 100. Communication beacons 140 may be passive devices from which storage containers 200 or an external control system detects their locations, or may be active devices configured to communicate with active or passive communication components within storage containers 200 and/or an external control system.

As illustrated in FIGS. 3 and 4, storage containers 200 are illustrated moving in directions "R" and "L," respectively, along downwardly-angled segments 110 of guide structure 100. Upon reaching valleys 104, information that the storage containers 200 have reached the respective valleys 104 is communicated between the storage containers 200, beacons 140, and/or an external control system to signal the storage containers 200 to increase their buoyancy, thus allowing the storage containers 200 to continue in the "R" and "L" directions, respectively, along the upwardly-angled segments 110.

As an alternative to location or proximity communication using beacons 140, storage containers 200 may contain GPS or other suitable location-tracking components to enable detection of the location of storage containers 200, and/or storage containers 200 may be configured to determine the presence of a joint (or other features) in guide structure 100 in any other suitable manner such as, for example, via on-board sensors that detect when the storage containers 200 have stopped moving, have sunk down and/or floated up at a particular rate or distance, etc., thus enabling determination that the storage containers 200 have reached a peak or valley 102, 104, respectively.

Although guide structure 100 is shown in FIGS. 1-4 as only providing a single path, it is contemplated that three or more angled segments 110 at different angles and/or orientations may intersect at one or more joints of guide structure 100 to enable directing the storage containers 200 along various different paths. Similarly as above, a storage container 200 may be directed along a particular path by determining the location thereof and varying (or maintaining) the buoyancy thereof such that the storage container 200 is directed through the appropriate angled segment 110 at each joint.

Figure 5:
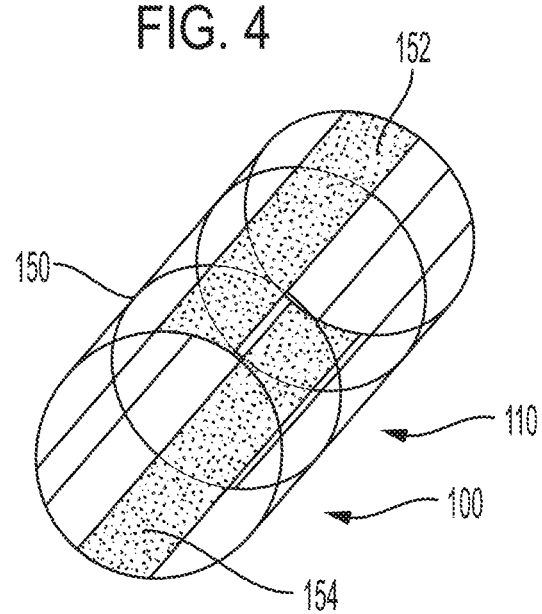
FIG. 5 is a perspective view of a portion of a guide tube configured for use with the aquatic transportation, storage, and distribution system of FIG. 1, according to an embodiment.

FIG. 5 illustrates an exemplary configuration of a portion of an angled segment 110 of guide structure 100. As illustrated in FIG. 5, at least a portion of angled segments 110 may define a tubular configuration of wire mesh or perforated material 150 to contain and guide storage containers 200 (FIGS. 1 and 2) therethrough. Upper and lower plates 152, 154 may be provided to provide a smoother guide surface for storage containers 200, thus inhibiting "bouncing" or "jumping" of storage containers 200 over the joints between the wire that make up the wire mesh or perforated material 150. Other suitable configurations for forming guide structure 100 are also contemplated.

Figure 6:
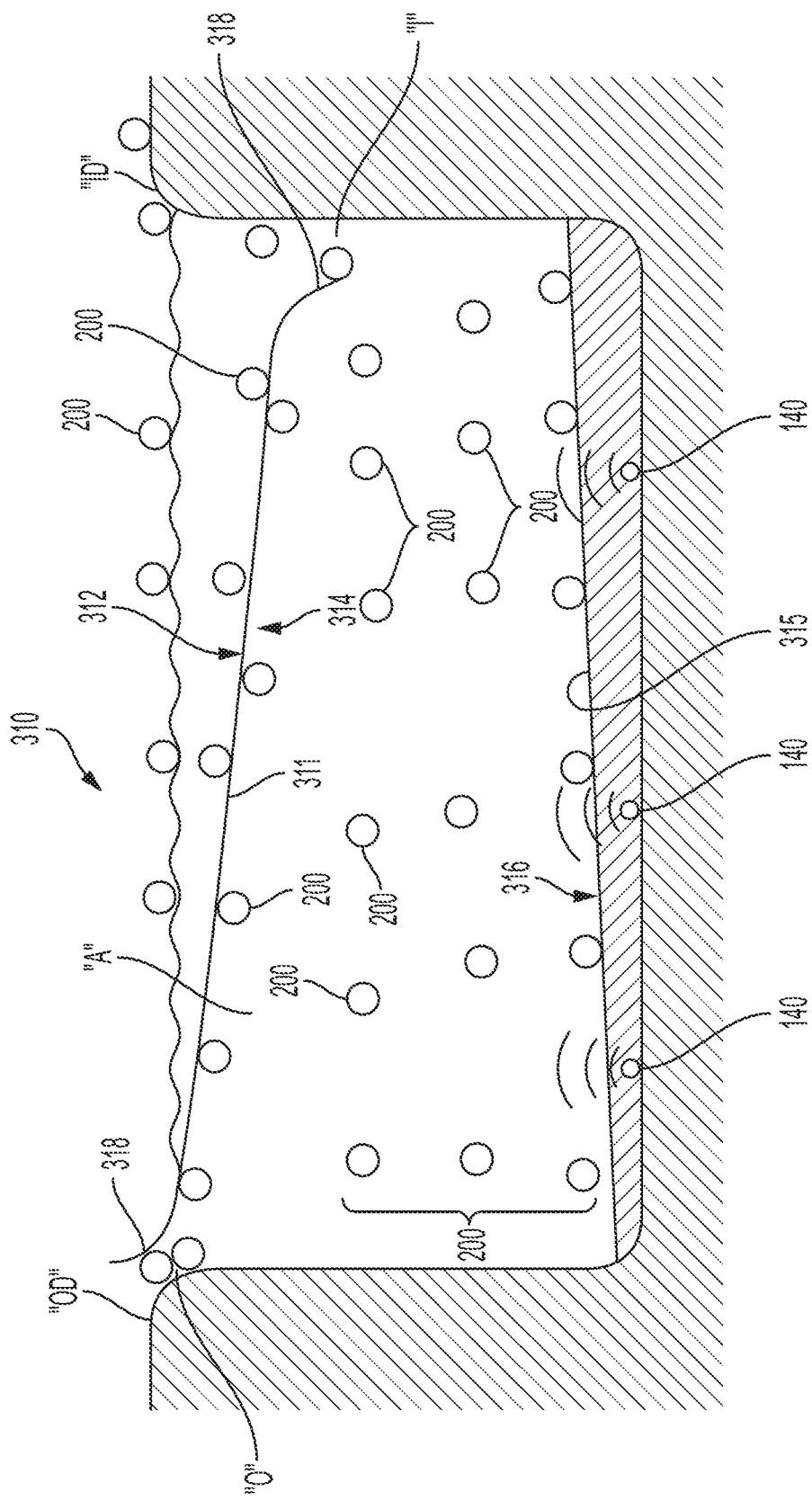
FIG. 6 is a cross-sectional view of another aquatic transportation, storage, and distribution system provided in accordance with aspects of the present disclosure, according to an embodiment.

Referring now to FIG. 6, another aquatic transportation, storage, and distribution system provided in accordance with the present disclosure is shown in use in an aqueous environment "A" and generally identified by reference numeral 310. System 310 includes a plurality of storage containers 200 and a guide structure forming a plurality of angled guide surfaces 312, 314, 316. The guide structure may be a connected unit or may include plural separate components that cooperate to define the various guide surfaces 312, 314, 316. For example, as illustrated in FIG. 6, the guide structure includes a planar guide structure 311 defining, on an upwardly-facing side thereof, guide surface 312, and, on a downwardly-facing side thereof guide surface 314. The guide structure also includes a guide ramp 315 defining guide surface 316. Planar guide structure 311 may include flared ends 318 to facilitate movement of storage container 200 therealong.

Similarly as detailed above with respect to system 10 (FIGS. 1-4), by controlling the buoyancy of storage containers 200, storage containers 200 interact with the guide structure in a particular manner to move the storage containers 200 to a desired position. For example, storage containers 200 may initially be deposited from an input dock "ID" into the aqueous environment "A" to float along the surface thereof. When it is desired to store one of the storage containers 200 within the aqueous environment "A," a signal is communicated, e.g., from an external control system, to the storage container 200 to decrease the buoyancy thereof such that the storage container 200 sinks down, ultimately contacting guide surface 312, which guides the storage container 200 therealong to an input "I" into the storage portion of the aqueous environment "A." Upon reaching the input "I," storage container 200 is no longer constrained to move along guide surface 312 and, thus, is permitted to sink towards the floor of the aqueous environment "A" until the storage container 200 contacts guide surface 316, which guides the storage container 200 therealong. The storage container 200 may move along guide surface 316 to a desired position (as determined by communication with beacons 140, for example). When the desired position is reached, the buoyancy of the storage container 200 may be increased a desired amount such that the storage container 200 floats up to a particular position. As can be appreciated, in this manner, an array of storage containers 200 may be stored at various horizontal and vertical positions within the aqueous environment "A."

Continuing with reference to FIG. 6, when it is desired to retrieve a storage container 200, the buoyance of that particular storage container 200 is increased such that the storage container 200 floats up from its position within the aqueous environment "A" into contact with guide surface 314, which guides the storage container 200 therealong to an output "O" of the aqueous environment "A," where the storage container 200 may be retrieved at an output docket "OD."

Figure 7:
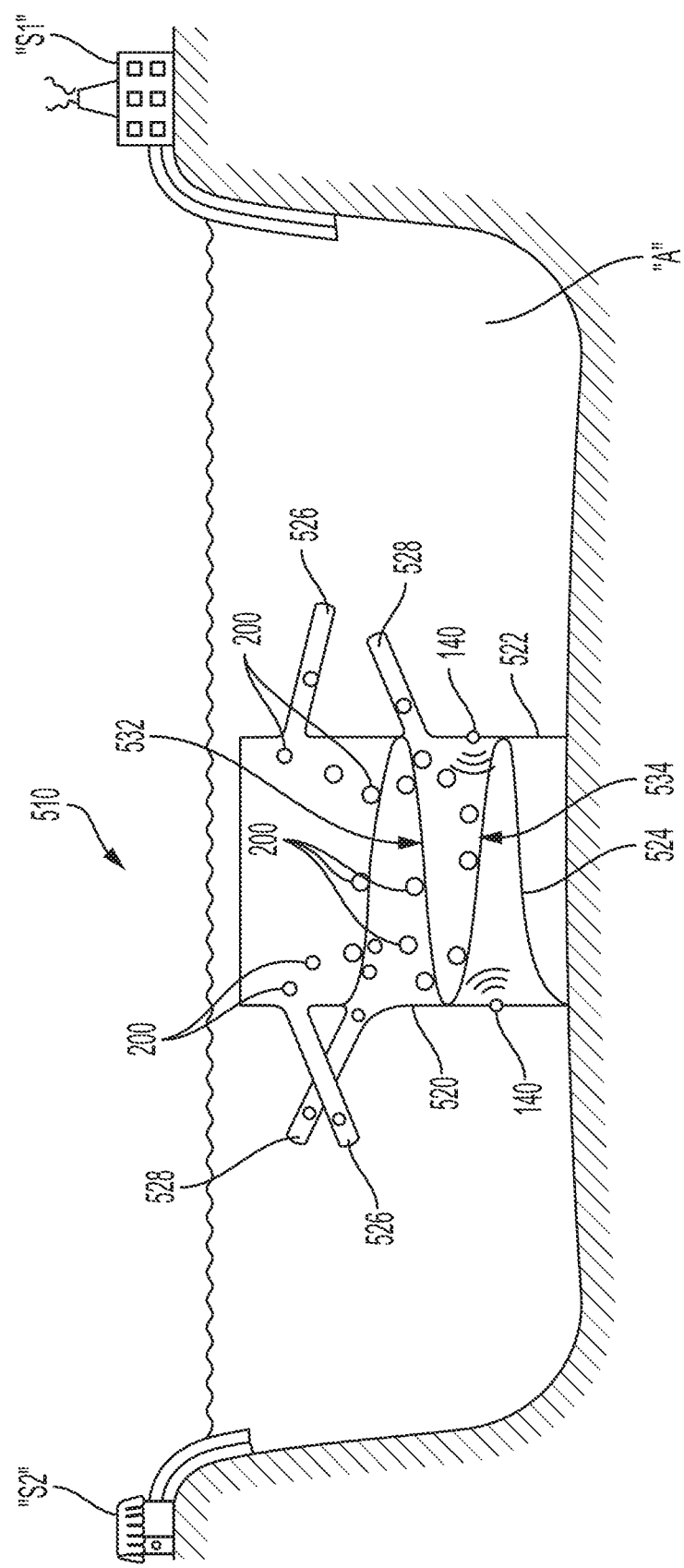
FIG. 7 is a cross-sectional view of yet another aquatic transportation, storage, and distribution system provided in accordance with aspects of the present disclosure, according to an embodiment.
Figure 8:
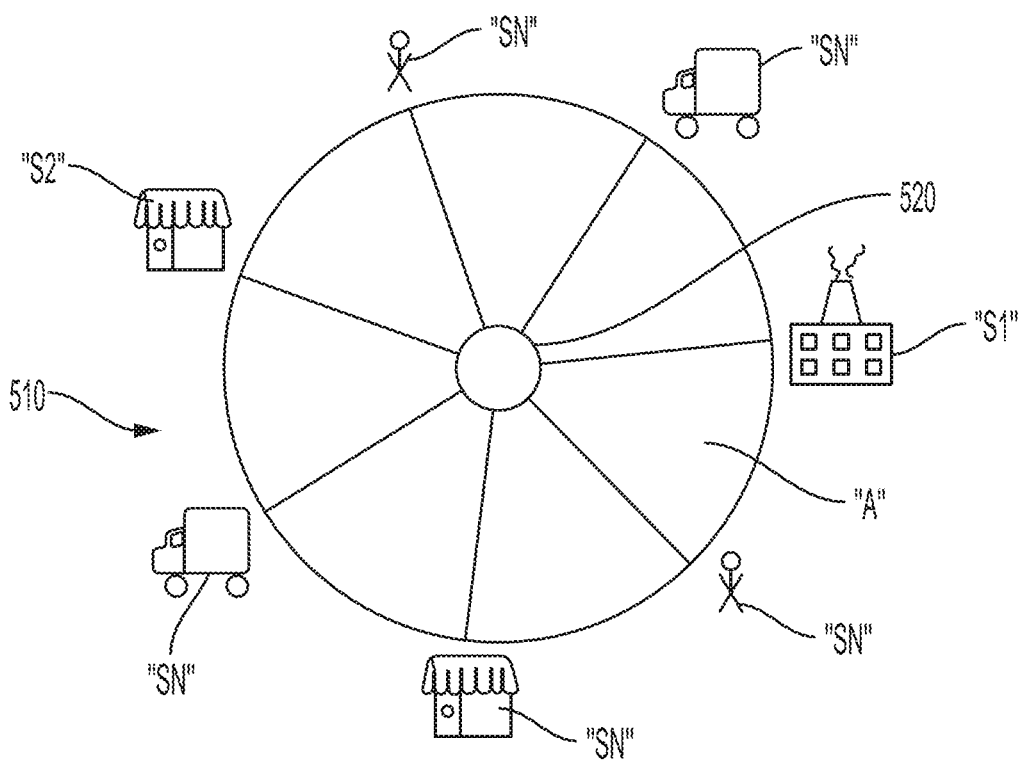
FIG. 8 is a schematic illustration of a distribution network served by the aquatic transportation, storage, and distribution system of FIG. 7, according to an embodiment.
Figure 9:
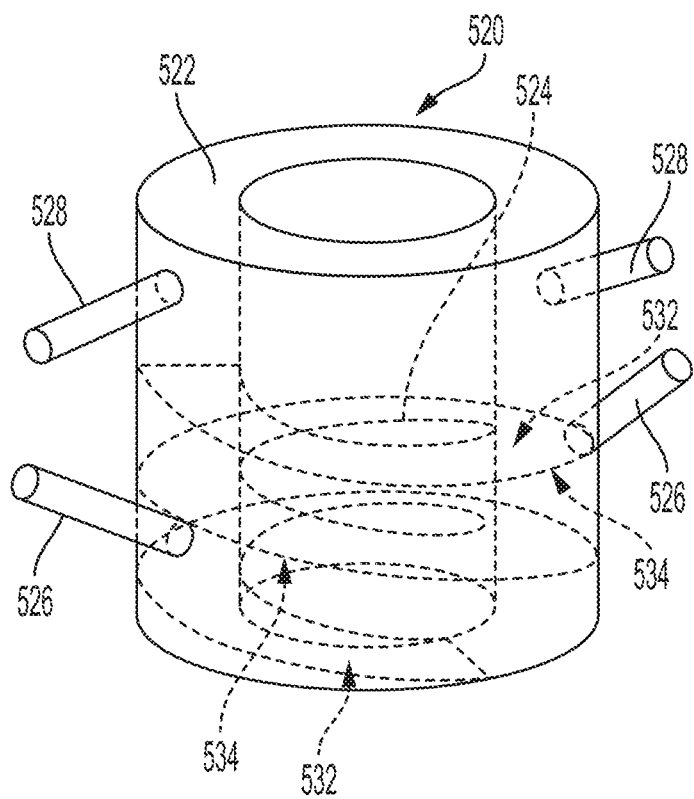
FIG. 9 is a distribution apparatus of the aquatic transportation, storage, and distribution system of FIG. 7, according to an embodiment.

Referring to FIGS. 7-9, another aquatic transportation, storage, and distribution system provided in accordance with the present disclosure and shown in use within an aquatic environment "A" is generally identified by reference numeral 510. System 510 includes a guide structure 520 configured to receive storage containers 200 from and output storage containers 200 to particular stations "S1, S2 . . . SN," which may be, for example, factories, stores, transportation hubs, end users, distribution centers, etc. The stations "S1, S2 . . . SN" may be arranged radially about the guide structure 520 (and the aqueous environment "A"), or in any other suitable manner.

As best shown in FIGS. 7 and 9, the guide structure 520 includes a base 522 supporting one or more angled guides 524 such as, for example, a helical angled guide 524 defining an upper guide surface 532 and a lower guide surface 534. Base 522 further includes various input ports 526 and output ports 528 in communication therewith to receive and send storage containers 200. More specifically, storage containers 200 may be output from one or more stations "S1, S2 . . . SN" into the aqueous environment "A." Once within the aqueous environment "A," the buoyancy of the storage containers 200 may be controlled to guide the storage containers 200 into one of the input ports 526 of the base 522.

Once a storage container 200 enters one of the input ports 526 of base 522, the storage container 200 is disposed within the helical angled guide 524 between the upper guide surface 532 and the lower guide surface 534 thereof. If it is desired to move the storage container 200 upwardly within base 522, a signal is communicated, e.g., from an external control system, to the storage container 200 to increase the buoyancy thereof such that the storage container 200 floats up into contact with lower guide surface 534, which guides the storage container 200 therealong in a helically-upward direction through base 522. On the other hand, if it is desired to move the storage container 200 downwardly within base 522, a signal is communicated, e.g., from an external control system, to the storage container 200 to decrease the buoyancy thereof such that the storage container 200 sinks down into contact with upper guide surface 532, which guides the storage container 200 therealong in a helically-downward direction through base 522. In this manner, the storage container 200 may be moved to any suitable position within base 522 such as, for example, into an output port 528. From the output port 528, the storage container is directed to one of the stations "S1, S2 . . . SN" for retrieval from the aqueous environment "A."

Figure 10:
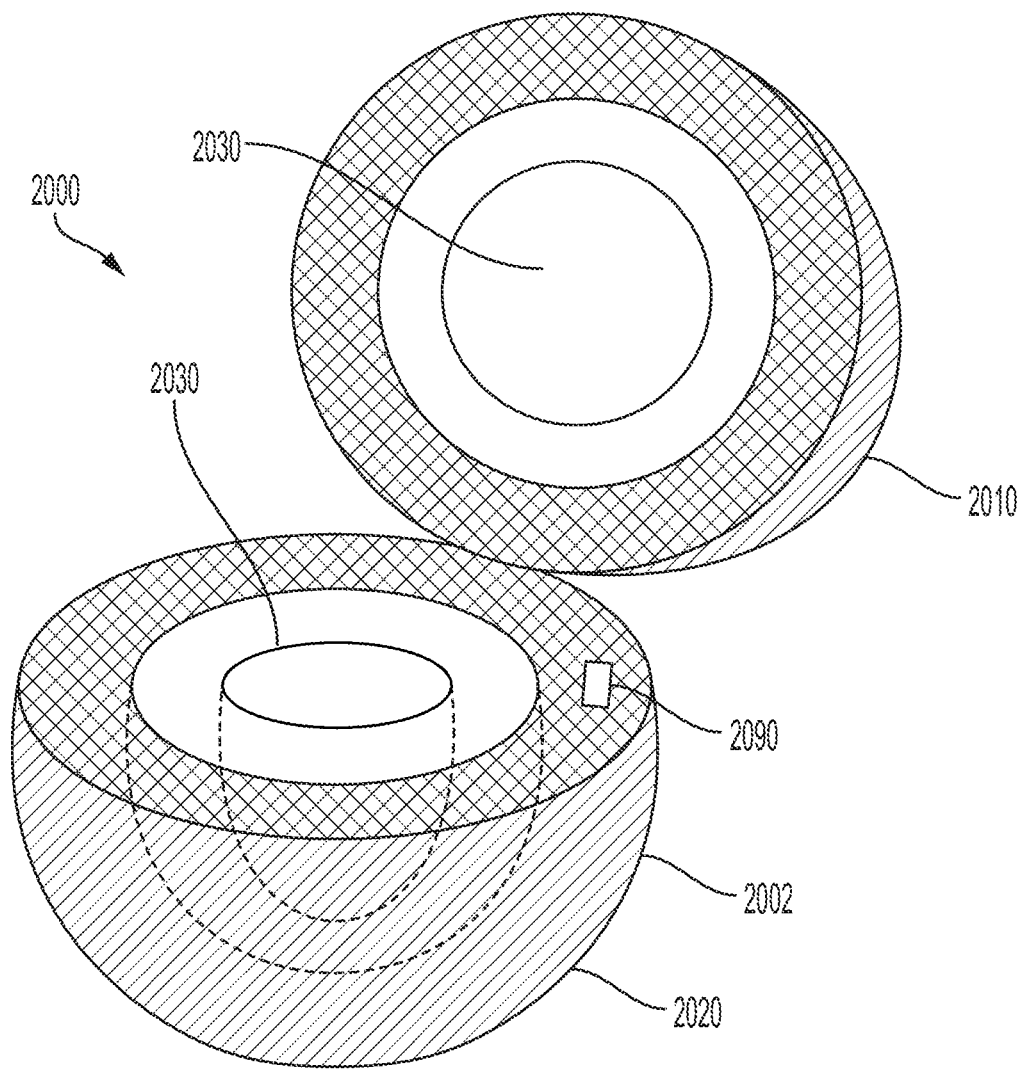
FIG. 10 is a perspective view of a storage apparatus configured for use with any of the aquatic transportation, storage, and distribution system of the present disclosure, according to an embodiment.
Figure 11:
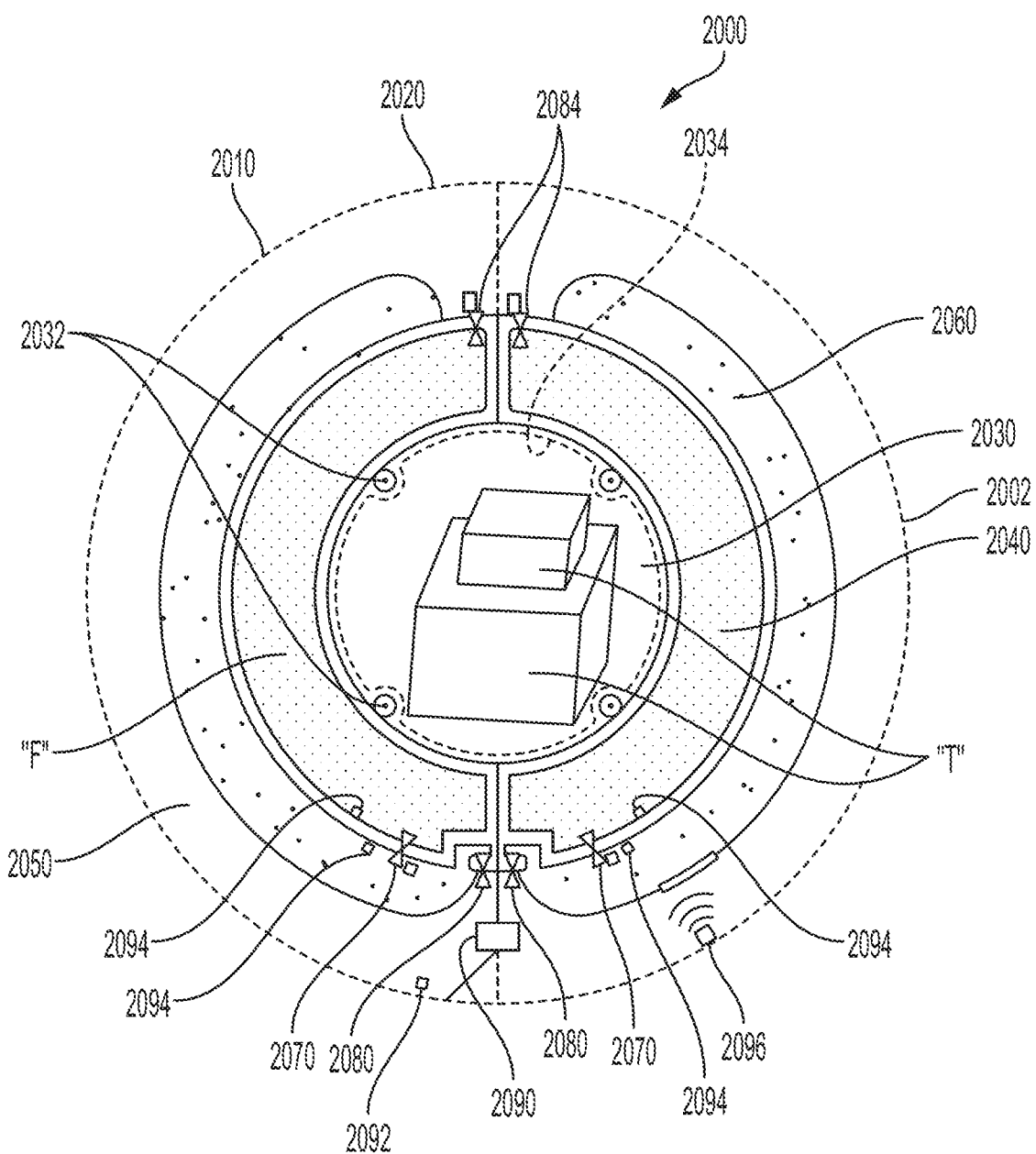
FIG. 11 is a cross-sectional view of the storage apparatus of FIG. 10, according to an embodiment.

Turning now to FIGS. 10 and 11, one embodiment of a storage container configured for use with any of the above systems, combinations thereof, or any other suitable aquatic transportation, storage, and distribution system is shown generally identified by reference numeral 2000. However, other suitable storage containers for use with the above-detailed systems are also contemplated. Storage container 2000 is a generally spherical shell 2002 (although other configurations are also contemplated) having a clamshell configuration such that shell 2002 is formed from first and second portions 2010, 2020 hinged to one another to enable opening and closing of storage container 2000 provide access to and seal off an internal storage compartment 2030 defined within shell 2002 of storage container 2000. In the closed position, storage container 2000 is configured to seal one or more items "T" within internal storage compartment 2030 in a waterproof manner such that, although storage container 2000 is used in an aqueous environment, the items "T" therein remain dry during use.

With particular reference to FIG. 11, shell 2002 includes an inner-most storage sphere 2034, an inner chamber 2040, and an outer chamber 2050. Shell 2002 further includes an expandable bladder 2060 disposed within outer chamber 2050. One or more valves 2070 enable selective communication between inner chamber 2040 and expandable bladder 2060, and one or more valves 2080 enable selective communication between bladder 2060 and outer chamber 2050. Inner-most storage sphere 2034 defines internal storage compartment 2030 therein and is configured to seal off internal storage compartment 2030 in a waterproof manner when closed, as noted above. Inner-most storage sphere 2034 may be coupled to inner chamber 2040 via a plurality of bearings 2032 (or other suitable gyroscopic configuration) to enable inner-most storage sphere 2034 to rotate relative to the rest of shell 2002 in any direction. Inner-most storage sphere 2034 may further include weights or other orientation-maintaining components (not shown) such that, regardless of the orientation of the rest of shell 2002, inner-most storage sphere 2034 is maintained in an up-right orientation, thereby maintaining the items "T" therein in an upright orientation.

Inner chamber 2040 stores a fluid "F," e.g., air, therein under pressure. Outer chamber 2050 may be formed from a wire mesh or perforated material to permit exchange of fluids, e.g., air, water, etc., between the interior and exterior thereof, while protecting bladder 2060 and providing a spherical outer form of storage container 2000 to facilitate movement of storage container 2000 along one or more guide structures.

Storage container 2000 further includes control circuitry 2090 including a microprocessor, memory, and battery for powering the control circuitry 2090. Control circuitry 2090 may be disposed at any suitable position such as, for example, secured within outer chamber 2050, although other positions are contemplated. Control circuitry 2090 is capable of sending and/or receiving communication signals from beacons 140 (see FIG. 1) and/or an external control system and is configured to control valves 2070, 2080 (e.g., solenoid valves, or other electrically-controlled valves, or other suitable valves) in accordance with communications received from beacons 140 (see FIG. 1) and/or an external control system to thereby vary the buoyancy of storage container 2000. Additionally or alternatively, various sensors, e.g., a water pressure sensor 2092 for sensing the water pressure and/or fluid pressure sensors 2094 for sensing the pressure within inner chamber 2040 and bladder 2060, are provided to communicate such pressure information to control circuitry 2090 to enable control circuitry 2090 to control valves 2070, 2080 in accordance therewith.

As an addition or alternative to sensors 2094 water pressure and/or fluid pressure may be sensed via sensors associated with or incorporated into valves 2070, 2084. With respect to valves 2084 in particular, such a configuration enables a user to readily determine the fluid pressure when filling or re-filling inner chamber 2040 with the pressurized fluid "F," to ensure an appropriate amount of pressurized fluid "F" is delivered and that inner chamber 2040 is filled to an appropriate fluid pressure.

Further, as an addition or alternative to sensors 2094, a proximity sensor (or sensors) 2096 mounted, for example, on the interior surface of chamber 2050, may be utilized to determine a distance between chamber 2050 and the outer surface of bladder 2060. Based on this proximity measurement, the pressure or volume within bladder 2060, and, thus, the buoyancy of storage container 2000 can be determined (or the buoyancy may be determined directly from the proximity measurement). Proximity sensor 2096 may be disposed in other suitable locations and/or other sensors may be employed.

In use, when it is desired to increase the buoyancy of storage container 2000, e.g., when an appropriate communication is received, control circuitry 2090 directs valves 2070 to open for a period of time, thereby expelling some of the pressurized fluid "F" stored within inner chamber 2040 into bladder 2060, causing bladder 2060 to expand within outer chamber 2050. As the pressurized fluid "F" escapes from inner chamber 2040 and flows into bladder 2060, bladder 2060 is expanded. As a result, the overall density of storage container 2000 is decreased, making storage container 2000 relatively more buoyant such that storage container 2000 is urged to float upwardly.

When it is desired to decrease the buoyancy of storage container 2000, e.g., when an appropriate communication is received, control circuitry 2090 directs valves 2080 to open for a period of time, thereby allowing the fluid "F" within bladder 2060 to exit through valves 2080 into outer chamber 2050. Since outer chamber 2050 is a wire mesh or perforated material (or other suitable aperture or porous formation), the fluid "F" escapes storage container 2000 into the surrounding environment. Once the fluid "F" that was previously within bladder 2060 escapes from storage container 2000, bladder 2060 is contracted, and the buoyancy of storage container 2000 is decreased such that storage container 2000 is urged to sink downwardly. As necessary, e.g., before or after use, inner chamber 2040 may be re-filled with pressurized fluid "F," e.g., via valves 2084.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. An aquatic transportation, storage, and distribution system, comprising:
one or more storage containers capable of retaining one or more items therein, wherein the storage container is configured to selectively vary the buoyancy thereof to urge the storage container to float up or sink within an aquatic environment; and
a guide structure supported at least partially within the aquatic environment, the guide structure including at least one non-horizontal segment,
wherein the storage container is configured to interact with the at least one segment as the storage container is urged to float up or sink within the aquatic environment such that the storage container is moved along the segment.

2. The system of claim 1, further comprising a location communication system configured to determine the location of the storage containers.

3. The system of claim 2, further comprising an external control system, wherein the location communication system comprises:
one or more proximity sensors, and one or more communication beacons, from which the storage containers, or the external control system determines the respective locations of the storage containers.

4. The system of claim 2, wherein the location communication system comprises one or more global positioning system sensors.

5. The system of claim 2, wherein the location is determined relative to the guide structure or a point thereon.

6. The system of claim 3, wherein the external control system is configured to send a signal to direct the storage container to vary its buoyancy wherein the signal is based on the location of the storage container.

7. The system of claim 6, wherein the external control system comprises one or more signal transmitters, one or more signal receivers, one or more programmable processors, and one or more memory devices.

8. The system of claim 6, wherein the varying of the buoyancy comprises a pressurized fluid exchange within multiple chambers of the storage container, which varies the buoyancy of the storage container to move the storage container along the segment of the guide structure.

9. The system of claim 1, wherein the segment is a tubular configuration.

10. The system of claim 9, wherein the tubular configuration comprises wire mesh or perforated material with one or more guide plates covering the wire mesh or perforated material inside the tubular configuration.

11. The system of claim 1, wherein the one or more storage containers each comprise:
a shell capable of opening and closing;
an inner chamber comprising a pressurized fluid;
an internal storage compartment of the inner chamber, configured to seal one or more items within; and
an outer chamber comprising one or more expandable bladders and one or more valves connected to the inner chamber,
wherein the inner chamber and outer chamber are configured to permit an exchange of fluids to control buoyancy of the storage container within an aquatic environment.

12. The system of claim 11, wherein the internal storage compartment is coupled to the inner chamber via a plurality of bearings or gimbals,
wherein the internal storage compartment rotates in any direction relative to the rest of the storage container by using one or more counterweights, such that, the internal storage compartment maintains a desired orientation regardless of the orientation of the rest of the storage container.

13. The system of claim 11, wherein:
the shell is comprised of wire mesh or perforated material;
the pressurized fluid is comprised of compressed gas; and
the valves are comprised of pneumatic, hydraulic, electric, or electromechanical valves.

14. The system of claim 11, the one or more storage containers each comprising:
one or more control systems, comprised of:
one or more programmable processors;
one or more memory devices; and
one or more batteries,
wherein the control system is capable of receiving signals from one or more communication beacons of one or more external control systems, and the one or more processors are configured to control the valves on the basis of external control signals to thereby vary the buoyancy of the storage container.

15. The system of claim 14, wherein the control system is further configured to send signals to the communication beacons, or to the external control systems to provide information about the location of the storage container.

16. The system of claim 14, the one or more storage containers each further comprising:
one or more sensors associated with or incorporated into the valves,
wherein the sensors are configured to measure external water pressure and the internal fluid pressure within the inner chamber and the bladder, and to communicate the pressure information to the control system to control the valves, and to vary the buoyancy of the storage container.

17. The system of claim 11, the one or more storage containers each comprising a global positioning system sensor configured to send signals to the communication beacons, or to the external control systems to provide information about the location of the storage container.

18. A method of aquatic transportation, storage, and distribution, comprising:
varying a buoyancy of one or more storage containers to urge the storage container to float up or sink within an aquatic environment into contact with a guide structure, such that the storage container is moved along at least one non-horizontal segment of the guide structure.

19. The method according to claim 18, further comprising:
determining a location of the storage container relative to the guide structure, or a point thereon; and
varying the buoyancy of the storage container based on the location of the storage container.

20. The method of claim 18, wherein the storage container is routed to a specified extraction point for retrieval from the aquatic environment.

* * * * *